(12) United States Patent
Cole et al.

(10) Patent No.: US 8,501,644 B2
(45) Date of Patent: Aug. 6, 2013

(54) ACTIVATED PROTECTIVE FABRIC

(76) Inventors: Christine W. Cole, Six Mile, SC (US);
Philip J. Brown, Williamston, SC (US);
Kathryn Stevens, Williamston, SC
(US); Deborah K. Lickfield, Easley, SC
(US)

( * ) Notice: Subject to any disclaimer, the term of this patent is extended or adjusted under 35 U.S.C. 154(b) by 507 days.

(21) Appl. No.: 12/476,684

(22) Filed: Jun. 2, 2009

(65) Prior Publication Data
US 2010/0300054 A1 Dec. 2, 2010

(51) Int. Cl.
*D04H 1/00* (2006.01)
(52) U.S. Cl.
USPC ........... 442/337; 442/194; 442/195; 442/334; 442/338; 55/486; 55/527; 55/528; 5/413 R
(58) Field of Classification Search
USPC .......... 55/522–528; 442/59, 60, 76, 123–125, 442/164–171, 194, 195, 334, 337, 338; 5/413 R–413 AM; 156/60, 306.3
See application file for complete search history.

(56) References Cited

U.S. PATENT DOCUMENTS

| | | | |
|---|---|---|---|
| 4,245,001 A | 1/1981 | Phillips et al. | |
| 4,290,378 A | 9/1981 | Wilkie | |
| 4,515,761 A * | 5/1985 | Plotzker | 423/240 R |
| 4,639,397 A | 1/1987 | Sato et al. | |
| 4,748,065 A * | 5/1988 | Tanikella | 428/152 |
| 5,057,368 A | 10/1991 | Largman et al. | |
| 5,182,162 A * | 1/1993 | Andrusko | 428/219 |
| 5,200,248 A | 4/1993 | Thompson et al. | |
| 5,496,627 A | 3/1996 | Bagrodia et al. | |
| 5,704,966 A | 1/1998 | Rohrbach et al. | |
| 5,713,971 A | 2/1998 | Rohrbach et al. | |
| 5,744,236 A | 4/1998 | Rohrbach et al. | |
| 5,759,394 A | 6/1998 | Rohrbach et al. | |
| 5,851,562 A | 12/1998 | Haggard et al. | |
| 5,891,221 A | 4/1999 | Rohrbach et al. | |
| 5,902,384 A | 5/1999 | Rohrbach et al. | |
| 5,951,744 A | 9/1999 | Rohrbach et al. | |
| 5,972,505 A | 10/1999 | Phillips et al. | |
| 6,004,381 A | 12/1999 | Rohrbach et al. | |
| 6,048,614 A | 4/2000 | Rohrbach et al. | |
| 6,117,802 A | 9/2000 | Rohrbach et al. | |
| 6,158,204 A | 12/2000 | Talley et al. | |
| 6,372,004 B1 * | 4/2002 | Schultink et al. | 55/382 |
| 6,432,179 B1 * | 8/2002 | Lobovsky et al. | 96/296 |
| 6,514,306 B1 * | 2/2003 | Rohrbach et al. | 55/524 |
| 6,551,353 B1 | 4/2003 | Baker et al. | |

(Continued)

OTHER PUBLICATIONS

Fall 2005 Annual Meeting and Technical Conference, *Fiber Science—The Next Generation*, Oct. 17-Oct. 19, 2005, New jersey Institute of Technology, pp. 1-122, 2005.

(Continued)

*Primary Examiner* — Duane Smith
*Assistant Examiner* — Thomas McKenzie
(74) *Attorney, Agent, or Firm* — Dority & Manning, PA

(57) ABSTRACT

Disclosed are fibrous activated materials that can remove and/or deactivate potentially dangerous airborne agents from a gas or air stream. Disclosed materials are multi-layer materials that include a fibrous nonwoven interceptor layer and an active layer immediately adjacent the interceptor layer. The interceptor layer is a fibrous membrane of very low basis weight and defines a relatively low porosity, and the active layer describes geometries, chemistries, etc. that can entrap and/or decontaminate compounds contained in an airstream passing through the material. Disclosed materials can be utilized in forming protective garments, face masks, and the like.

27 Claims, 2 Drawing Sheets

U.S. PATENT DOCUMENTS

| | | |
|---|---|---|
| 6,627,025 B1 | 9/2003 | Yu |
| 6,641,648 B2 | 11/2003 | Walker et al. |
| 6,705,069 B1 | 3/2004 | Talley et al. |
| 6,706,092 B2 | 3/2004 | Rohrbach et al. |
| 6,767,498 B1 | 7/2004 | Talley, Jr. et al. |
| 6,803,102 B1 | 10/2004 | Talley et al. |
| 6,838,402 B2 | 1/2005 | Harris et al. |
| 6,861,142 B1 | 3/2005 | Wilkie et al. |
| 7,026,014 B2 | 4/2006 | Luzinov et al. |
| 7,037,097 B2 | 5/2006 | Wilkie et al. |
| 7,115,150 B2 | 10/2006 | Johnson et al. |
| 7,160,612 B2 | 1/2007 | Magill et al. |
| 7,179,412 B1 | 2/2007 | Wilkie et al. |
| 7,252,493 B1 | 8/2007 | Johnston et al. |
| 7,261,813 B2 | 8/2007 | Marcus et al. |
| 7,300,272 B1 | 11/2007 | Haggard |
| 7,549,431 B1 * | 6/2009 | Farnworth et al. ............ 135/115 |
| 2002/0172792 A1 | 11/2002 | Jarvis et al. |
| 2003/0089092 A1 * | 5/2003 | Bause et al. .................... 55/524 |
| 2004/0038014 A1 | 2/2004 | Schaefer et al. |
| 2004/0116025 A1 | 6/2004 | Gogins et al. |
| 2004/0170836 A1 * | 9/2004 | Bond et al. .................... 428/398 |
| 2004/0261381 A1 * | 12/2004 | Heikamp ........................ 55/486 |
| 2005/0032450 A1 | 2/2005 | Haggard et al. |
| 2005/0193696 A1 * | 9/2005 | Muller et al. .................... 55/486 |
| 2005/0227564 A1 * | 10/2005 | Bond et al. .................... 442/337 |
| 2006/0012072 A1 | 1/2006 | Hagewood et al. |
| 2006/0196359 A1 * | 9/2006 | Gillingham et al. ............ 95/273 |
| 2006/0201881 A1 | 9/2006 | Marcus et al. |
| 2007/0026193 A1 | 2/2007 | Luzinov et al. |
| 2007/0039300 A1 * | 2/2007 | Kahlbaugh et al. ............. 55/527 |

OTHER PUBLICATIONS

Related U.S. Patent Application Form, 2007.
International Search Report for PCT/US10/36815, 2010.

* cited by examiner

ACTIVATED PROTECTIVE FABRIC

BACKGROUND

To protect individuals from potentially dangerous airborne agents, a plurality of approaches have been taken over the years. For instance, woven and non-woven fibrous materials have been designed for formation of masks, clothing, and the like to filter airborne agents. In general, there are five modes of particle removal in such fibrous filters: sieve effect, inertial impaction, interception, Brownian motion, and electrostatic charge effect. While sieve effect, in which particles above a certain size are physically prevented passage through the filter media, is often a primary removal method found in liquid filtration, fibrous gas and air filters utilize this mode to a lesser degree. The primary particle removal methods of fibrous gas and air filters include inertial impaction, in which a relatively large particle collides with a fiber and adheres as its inertia prevents adjustment to the streamline flow around the fiber; interception, in which a particle that is following the gas streamline through the filter comes within one particle radius of the fiber and is captured thereon; Brownian motion, in which the random path due to collision between particles and carrier gas molecules leads to random motion of the particles that increase the probability of impaction or interception between the particle and a fiber; and electrostatic capture, in which an opposite electrostatic charge between the fiber and the particle leads to attraction and adherence.

Unfortunately, optimization of one parameter of fibrous filtration media generally leads to a decline in another parameter. For instance, increase in porosity in a filter material can lower pressure drop across the filter and increase holding capacity, but will decrease collection efficiency. Decrease in fiber size and the resulting increase in fiber density possible due to the smaller fiber size can improve collection efficiency, but can lead to an increase in pressure drop across the filter. Similarly, forming a thicker filter can improve holding capacity, but will increase the pressure drop across the filter. Electrostatic charge has been applied to synthetic fibers to improve electrostatic capture, but these fibers tend to be large diameter fibers, and large fibers carry a decreased probability of a particle colliding with a fiber.

Moreover, when considering utilization of the filter materials as protection devices for individuals, comfort of the wearer and time of effectiveness become important. For instance, a thick, heavy filtration material that provides high holding capacity can be unwearable due to weight, body heat build-up and the like. Additionally, high pressure drop across a filtration material can prevent air flow all together (in the case of clothing) or cause breathing difficulties (in the case of face masks). Moreover, a filter material that will reach holding capacity in very short order will be of little practical use.

In an attempt to overcome some of the problems presented by filter materials, attempts have been made to develop materials that include active chemistries. For instance, filter elements including decontamination media are often incorporated in protective masks that can remove and/or detoxify agents from air breathed by the wearer. Unfortunately, functionalization of filtration materials does not solve some problems of protective materials. For instance, it has proven very difficult to optimize contact time between functionalized filter material and the air to be filtered while maintaining limited pressure drop across the material, weight of the material and the related comfort of the wearer.

Accordingly, while the addition of active chemistries to fibrous filtration media has greatly improved the art, room for further improvement exists. What are needed in the art are fibrous materials and methods for forming such material that can provide good contact time between active chemistries and air to be filtered as well as provide good holding capacities for filtered agents, while minimizing pressure drop across the materials.

SUMMARY

According to one embodiment, disclosed are protective fibrous materials. Disclosed materials include one or more interceptor layers and one or more active layers positioned adjacent to the one or more interceptor layers. Each of the one or more interceptor layers can include polymeric fibers in a fibrous web formation. According to another embodiment, each of the interceptor layers can including ceramic or metal fibers in a fibrous web formation. An interceptor layer can have a basis weight of less than about 50 grams per square meter (gsm). An interceptor layer can include fibers that are quite small, for instance less than about 15 micrometers in average diameter, in one embodiment. In one embodiment, an interceptor layer can include nanofibers.

In general, each of the one or more active layers can have a basis weight of between about 5 and about 100 gsm. In one embodiment, an active layer can include a plurality of polymeric fibers. A protective fibrous material can describe a Frazier Air Permeability of at least about 1 cubic foot per meter (cfm).

An active layer can include fibers defining a non-circular cross section. For example, fibers of an active layer can be capillary channeled fibers. Non-circular cross sectional fibers can include a particulate material in the channels. For instance, the particulate material can carry a desirable chemistry on the surface.

Fibers of an active layer can include a functional chemistry that can decontaminate a threat agent. For example, active layer fibers can include a functional chemistry that can collect, adhere, or otherwise bond a threat agent onto the surface of the fiber. In one embodiment, the functional chemistry can be a characteristic of an enzyme bound to the fiber.

The one or more interceptor and active layers can be layered in any suitable arrangement. For example, a protective material can include a first active layer immediately adjacent to an interceptor layer and a second active layer immediately adjacent to the interceptor layer such that the interceptor layer is sandwiched between the two active layers.

Also disclosed herein are protective structures and methods of forming such structures. In one embodiment, a protective structure can include a panel of a protective fibrous material. For example, a protective fibrous material can include one or more interceptor layers including polymeric fibers in a nonwoven web, each interceptor layer having a basis weight of less than about 10 gsm and a porosity that provides a Frazier Air Permeability of at least about 1 cfm. A protective fibrous material can also include one or more active layers in proximity to the one or more interceptor layers, each active layer including a plurality of polymeric fibers that entrap or decontaminate a threat agent, each active layer having a basis weight of between about 5 and about 100 gsm. A protective fibrous material can have a Frazier Air Permeability of at least about 0.1 cfm. A composite protective structure can be, for example, a garment, a tent, a blanket, a sleeping bag, a filter medium, or the like. In forming a structure, a first flexible panel can be joined to a second flexible panel with a stitched or stitchless seam or according to any other joining method.

One method of forming a protective structure can include locating one or more interceptor layers adjacent to one or more active layers and laminating the layers together to form a multilayer protective material. For instance, layers can be laminated to one another by application of heat and/or pressure. A method can also include adding a desired functional chemistry to fibers of an active layer.

BRIEF DESCRIPTION OF THE FIGURES

The presently disclosed subject matter may be better understood with reference to the Figures, of which.

Figure 1:
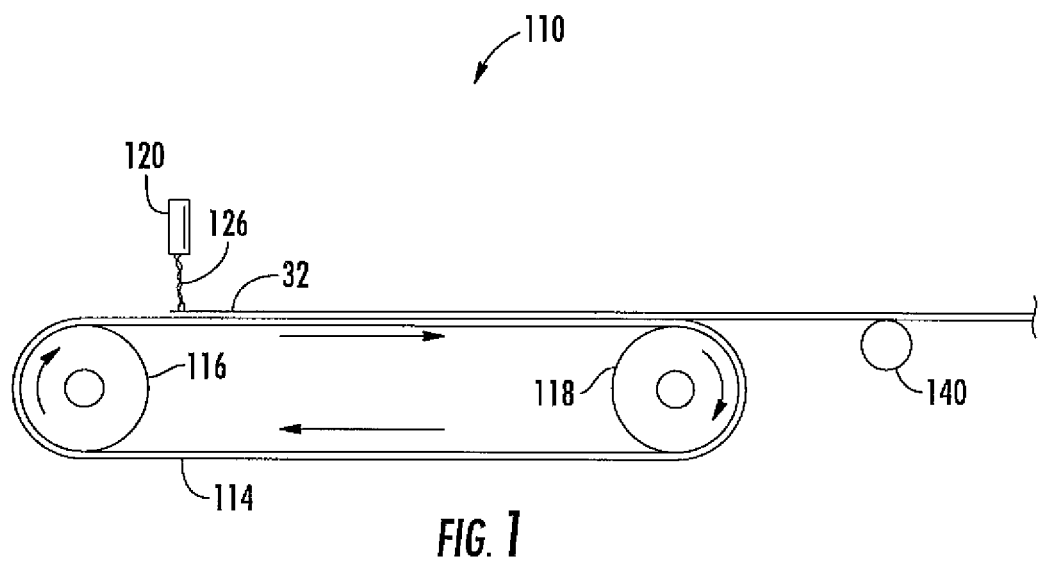
FIG. 1 is a schematic illustration of one embodiment of a system for forming a meltblown nonwoven interceptor layer as may be used in disclosed protective materials.
Figure 2:
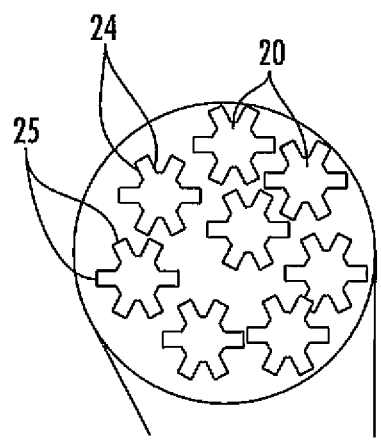
FIG. 2 is a schematic of a cross sectional view of exemplary capillary channeled fibers as may be incorporated in an active layer of disclosed protective materials.

Repeat use of references characters in the present specification and drawings is intended to represent same or analogous features or elements of the disclosed subject matter.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

In general, the present disclosure is directed to fibrous materials that can remove and/or deactivate potentially dangerous airborne agents from a gas or air stream. For instance, disclosed materials can be utilized in forming protective garments, face masks, and the like. As such, the present disclosure can be advantageous in one preferred embodiment for use in military, first responder, and medical personnel apparel.

Disclosed materials can purify a fluid stream, e.g., a gas or air stream, through one or more of entrapment, rejection, repulsion, decontamination, detoxification, or any other manner or combination thereof for removal of the potential dangers posed by agents, e.g., chemical or biological contaminants, that can be contained a fluid stream. Moreover, disclosed materials can exhibit extremely low pressure drop across the materials while providing high purification capabilities.

Fibrous activated materials disclosed herein are multilayer materials that include a one or more interceptor layers and one or more active layers adjacent the interceptor layer(s). An interceptor layer is generally a fibrous membrane of very low basis weight that can define a relatively low porosity, and an active layer can describe geometries, chemistries, etc. that can entrap and/or decontaminate compounds contained in an fluid stream passing through the material. According to one preferred embodiment, disclosed activated materials can be designed such that an active layer will be contacted by a contaminated fluid stream prior to an interceptor layer.

While not wishing to be limited to any particular theory, it is believed that the presence of one or more interceptor layers can encourage the formation of a turbulent flow pattern through the multi-layered material, and in particular, through one or more active layers adjacent to the interceptor layer(s). Development of a turbulent flow field through a material can encourage interaction between fibers of an active layer and threat agents contained in a flow. For example, a turbulent flow pattern through a layer can not only increase the time required for fluid to pass through a layer, thereby increasing the likelihood of interaction between a fiber and a threat agent compound of the flow, but can also lead to the development of low velocity eddies within the flow field, which can also increase the interaction between fibers and chemistries of an active layer and threat agents contained in a fluid flow. Beneficially, the increased likelihood of interaction between fibers of an active layer and threat agents carried in a stream, and the corresponding improved air purification capabilities of disclosed materials, can be brought about in disclosed materials without the development of a large pressure drop across the materials.

An interceptor layer can generally include a plurality of micro- and/or nano-sized polymeric fibers in a web formation of a low basis weight, e.g., a nonwoven web formation. For example, an interceptor layer can have a basis weight of less than about 50 grams per square meter (gsm), in one embodiment, or even lower in other embodiments, for example, less than about 10 gsm, less than about 8 gsm or less than about 5 gsm.

An interceptor layer can also have a porosity that describes a Frazier Air Permeability of at least about 1 cubic foot per minute (cfm). Frazier Air Permeability is commonly used as a measure of airflow through a material at a specified pressure drop. Measure of Frazier Air Permeability can be carried out according to ASTM D-737, which is incorporated herein by reference, as is generally known in the art, for instance utilizing the Frazier® Differential Pressure Air Permeability Measuring Instrument available from Frazier Precision Instrument Comopany, Inc. of Hagerstown, Md.

Polymers as may be utilized in forming polymeric fibers of an interceptor layer can include homopolymers and copolymers that can be processed to form the disclosed fibrous membranes. For instance, polyolefins such as polypropylenes or polyethylenes (e.g., polyethylene terephthalate), polyesters, polyanilines, polylactic acids, polyamides (nylons), polystyrenes, polyacrylates (e.g., polymethyl methacrylate), fluorocarbons, polyurethanes, polycarbonates, polysiloxanes, and so forth, can be utilized in forming an interceptor layer.

A polymeric composition for forming fibers as described herein can include one or more polymers as well as any desired additives as are generally known in the art. For example, a mixture can include suitable coloring agents, such as dyes or other pigments. Other additives that can be combined with a mixture can include, for example, one or more of anti-static agents, antioxidant agents, stabilizers, plasticizers, brightening compounds, clarifying agents, ultraviolet light stabilizing agents, nucleating agents, surface active agents, odor enhancing or preventative agents, light scattering agents, halogen scavengers, and the like.

An interceptor layer can include fibers of different materials, in one embodiment. For example, an interceptor layer can be formed of ceramic or metal fibers. In one embodiment, an interceptor layer can include polymeric fibers in conjunction with fibers of another material, e.g., ceramic and/or metal fibers.

Individual fibers of an interceptor layer can generally define an average diameter of less than about 1 mm. For example, fibers of an interceptor layer can have an average diameter of between about 100 μm and about 1 mm, or even smaller in other embodiments. For instance, fibers defining an average diameter of less than about 100 μm can be utilized, including fibers having a diameter of less than about 15 μm or less than about 1 μm, i.e., in one embodiment, an interceptor layer can include nanofibers. Polymer fibers have in the past been limited to much larger sizes. Technological advances, however, have enabled the formation of nanosized polymer fibers. For instance, electrospinning methods can be utilized to form extremely small polymer fibers as may be utilized in forming disclosed interceptor layers.

Recent developments have provided additional means for production of extremely small fibers. For instance, Hills, Inc. of Melbourne, Fla. has developed methods of producing microfibers and nanofibers through formation of meltblown bicomponent fibers and subsequent removal of one component of the fiber through dissolution, leaving a plurality of small, micro- or even nanosized fibers. For example, a bicomponent island-in-the-sea type fiber can be melt spun including multiple 'islands' formed of a first polymer (e.g., Nylon 6) held within a sea formed of a second polymer (e.g., ethylene vinyl alcohol (EVOH)). Following dissolution of the EVOH, the small fibers are released.

Methods and systems as may be utilized in forming small diameter polymeric fibers, including micro- and nanosized fibers, are further described in U.S. Pat. No. 7,300,272 to Haggard, U.S. Pat. No. 7,252,493 to Johnston, et al., U.S. Pat. No. 7,179,412 to Wilkie, et al., U.S. Pat. No. 7,160,612 to Magill, et al., U.S. Pat. No. 7,037,097 to Wilkie, et al., U.S. Pat. No. 6,861,142 to Wilkie, et al., U.S. Pat. No. 6,838,402 to Harris, et al., U.S. Pat. No. 6,803,102 to Talley, et al., U.S. Pat. No. 6,767,498 to Talley, Jr. et al., U.S. Pat. No. 6,705,069 to Talley, et al., U.S. Pat. No. 6,627,025 to Yu, U.S. Pat. No. 6,551,353 to Baker, et al., U.S. Pat. No. 6,158,204 to Talley, et al., U.S. Pat. No. 4,290,378 to Wilkie, U.S. Pat. No. 5,851,562 to Haggard, et al., and U.S. Patent Application Publications 2006/0012072 to Hagewood, et al. and 2005/0032450 to Haggard, et al. (all of which are incorporated herein by reference).

The manner in which an interceptor layer is formed may vary. For example, an interceptor layer may be formed in a wet-lay process according to conventional techniques. In a wet-lay process, a fiber furnish is combined with water to form an aqueous suspension. The aqueous suspension is then spread onto a wire or felt and dried to form the web.

In one embodiment, an interceptor layer may be formed from an aqueous suspension of fibers, as is known in the art, and then pressed onto the surface of a rotatable heated dryer drum, such as a Yankee dryer, by a press roll. As the web is carried through a portion of the rotational path of the dryer surface, heat is imparted to the web causing most of the moisture contained within the web to be evaporated. The web is then removed from the dryer drum by a creping blade.

In an alternative embodiment, instead of wet pressing the nascent membrane onto a dryer drum and creping the membrane, the membrane may be through-air dried. A through-air dryer accomplishes the removal of moisture from the base web by passing air through the web without applying any mechanical pressure.

Alternatively, an interceptor layer may be air-formed. In this embodiment, air is used to transport the fibers and form a web. Air-forming processes are typically capable of processing longer fibers than most wet-lay processes which may provide an advantage in some applications.

For exemplary purposes, one embodiment of a system for forming a meltblown nonwoven interceptor layer as may be used in disclosed protective materials is illustrated in FIG. 1. As shown, the system includes a forming machine generally 110 which may be used to produce a meltblown interceptor layer 32 in accordance with the present disclosure. Particularly, the forming machine 110 includes an endless foraminous forming belt 114 wrapped around rollers 116 and 118 so that the belt 114 is driven in the direction shown by the arrows.

The forming machine system of FIG. 1 may also include a die 120 which is used to form fibers 126. The throughput of the die 120 is specified in pounds of polymer melt per inch of die width per hour (PIH). As a thermoplastic polymeric composition exits the die 120, high-pressure fluid, usually air, attenuates and spreads the polymeric stream to form fibers 126. The fibers 126 may be randomly deposited on the forming belt 114 and form a meltblown interceptor layer 32. Fibers of an interceptor layer can be bound to one another utilizing any suitable means including an adhesive, applied heat, applied pressure, or some combination thereof.

As previously described, disclosed protective materials are multi-layer materials that include one or more interceptor layers adjacent to one or more active layers. More specifically, the active layer(s) can function to remove and/or decontaminate agents carried in a fluid stream as the stream passes over, through or partially through the layer. More specifically, the fibers of an active layer can include chemistries and/or geometries that can encourage removal and/or decontamination of agents carried in a fluid stream.

According to one embodiment, the preferred geometries and/or chemistries of fibers of an active layer can be determined based upon the types and kinds of agents that are expected to be encountered, as well as the desired low pressure drop across the layer during use. In general, an active layer can have a larger porosity than interceptor layer(s) of a composite material and can exhibit a basis weight of between about 5 and about 100 gsm.

Collection and removal from a fluid stream of airborne, non-biological particulates is the most common type of hazard protection. In this embodiment, physical entrapment of the particles within the layer structure can be the desired goal, and the individual fibers of the active layer can be designed accordingly.

Threat agents may take many different forms, however, and an active layer can include fibers designed to target one or multiple different types of threat agents. For example, particulate threat agents can include particulates that also include hazardous materials. By way of example, individual fibers of an active layer can target particulate agents such as an oxide dust contaminated with radioactive material. Accordingly, one embodiment of disclosed materials can encompass an active layer that incorporates one or more chemistries to decontaminate threat agents as may be contained in a fluid stream. An active agent can also provide multiple routes to purification of a fluid stream, e.g., entrapment in combination with decontamination of one or more threat agents contained in an air stream.

Following determination of the criteria of threat agents to be targeted by an active layer, the specific characteristics of the active layer can be designed. For instance, criteria such as the particle size distribution and adhesive characteristics of targeted threat agents as well as desired loading capacity of the layer can be determined prior to design of an active layer. Typical threat agents can vary greatly in both size and character. For example, gram-negative bacteria are on the order of 3 μm in their largest dimensions. *Bacillus anthracis* spores, however, may be up to 5 μm in length, with widths of about 1 μm, while vegetation spores occur at sizes above about 5 pm. Similarly, bioadhesion involves a complex set of interactions between living organisms and a surface that results in attachment, and specific bioadhesive characteristics can vary widely between agents. Thus, surface chemistry and topology of individual fibers in a layer can play a role in how a particular cell, spore or particle can interact with a surface.

In general, fibers of an active layer can include one or more polymers. For instance, purification of a stream can be achieved using fibers formed of base polymers chosen simply by cost and processing considerations. Other considerations for selection of polymers and polymeric fiber composition can include wettability, wicking capability, compatibility with materials of the interceptor layer, wearability, and so forth.

Polymeric fibers as may be utilized in disclosed purification materials can be formed according to any suitable methodology and from any polymeric material. For example, polymeric fibers may be melt spun from any of a number of different polymer precursors including without limitation, homopolymers or copolymers of any polypropylenes, polyethylenes (e.g., polyethylene terephthalate), polyesters, polyanilines, polylactic acids, polyamides (nylons), polystyrenes, polyacrylates (e.g., polymethyl methacrylate), fluorocarbons, polyurethanes, polycarbonates, polysiloxanes, and so forth.

In one embodiment, polymeric fibers can be meltspun and drawn according to standard formation technology as is known in the art. For instance, meltspinning technology as is generally known including suitably shaped spinnerets can be utilized followed by drawing of the nascent fibers according to standard methods for forming fibers. Polymeric fibers of an active layer can include polymers that are the same or different as polymers utilized in forming an adjacent interceptor layer. Polymeric fibers of an active layer can include additional additives as are known in the art, e.g., colorants, stabilizing agents, nucleating agents, and so forth.

In specific cases, the chemical make-up of a targeted agent can play a role in selection of polymers utilized in the fibers of an active layer. For example, oxide particles generally possess a charge that can be exploited to aid in immobilization. In this particular embodiment, fibers including polypropylene can be incorporated into an active layer, as the characteristics of polypropylene can enhance simple physical entrapment of oxide particles in an air stream via charge/charge interaction.

Polymeric fibers of an active layer can be modified to enhance purification of an air or gas stream. For example, polymeric fibers can be designed or enhanced physically and/or chemically to better entrap contaminants within an active layer, to better reject contaminants and prevent adherence to fibers, to better decontaminate contaminants, and so forth.

Modification of polymeric fibers of an active layer can enhance physical entrapment or rejection of an agent, depending upon the desired characteristics of the active layer. For instance, physical entrapment can be preferred for certain agents as it not only keeps the agent from being inhaled or making contact with skin, but can also encourage reaction with other chemistries of the fiber, for instance to encourage decontamination of the agent.

Rejection of agents may be preferred for other contaminants. For example, formation of a fiber so as to prevent adherence between airborne agents and the fiber can be utilized in those cases in which chemistries of an active layer can render the agent harmless. Encouraging an agent that has been rendered harmless to pass out of the material can maintain low pressure drop across the material and avoid decrease in holding capacity of the material over time. Filtration and rejection are essentially opposite processes, either of which can be encouraged as determined for a specific application. Rejection of airborne particulates that are biological in nature, such as spores, bacteria, and viruses, can occur via what is termed the "shark skin effect." In this process, bioadhesion can be mitigated by the proper choice of surface topography, surface energy and chemistry, and mechanics.

According to one embodiment, fiber geometry can be utilized to encourage the desired activity of the active layer. For example, fiber cross sectional shapes and diameters can be varied according to known practices to better design the activity of an active layer for an expected contaminant. For example, small denier fibers (e.g. about 10 denier (d) or less) can be preferred, as small diameter fibers can provide greater amounts of surface area per unit cross sectional area of a material. In other embodiments, larger fibers can be preferred, as large fibers (e.g., larger than about 25 d) can provide greater holding capacity to a material. Fibers with lower denier may be preferred in those embodiments in which an active compound is applied in a thin film on a fiber and surface area is the controlling factor in efficiency. Alternatively, larger fibers can be preferred when applications require greater volumes and addition of multiple different chemistries to a fiber, as larger fibers can provide larger surface areas for modifications. Mixtures of fiber sizes can be preferred in other embodiments.

Fiber shape and fiber diameter can also have an important bearing on the mechanical properties of the final product in terms of weight, density, breathability, and feel.

Fibers of non-circular cross section can be utilized in one embodiment so as to maximize surface area to volume ratios of the fibers of the active layers. Non-circular cross sectional fibers can provide additional benefits to an active layer as well, as described further below.

In one preferred embodiment, shaped fibers can be capillary channeled fibers such as those shown schematically in cross section in FIG. 2. As can be seen, each fiber strand 20 of FIG. 2 has six co-linear channels 24 extending the entire length of the exterior surface of the fiber 20. Each channel 24 is defined by a pair of opposed walls 25 that extend generally and longitudinally and form part of the exterior surface of the fiber 20. Desirably, these channels 24 and walls 25 extend down the entire length of the fiber 20 parallel to the longitudinal axis of the fiber 20 and are co-linear on each fiber 20. In one embodiment, the channels 24 can be configured to wrap around the length of the fiber 20 in a helical fashion. In any case, substantially all of the channels 24 can be co-linear on each fiber 20.

Additionally, in the course of combining multiple fibers 20 in formation of an active layer, whether the individual fibers have purely linear channels 24 or helical ones, it is possible that one or more, even all, of the fibers 20 in the layer will rotate about its/their own axis. In other words, some or all of the capillary-channeled fibers 20 may twist as they lay in an active layer. Accordingly, the channels 24 and walls 25 of some or all of the fibers 20 also may twist somewhat.

It should be understood that the number of channels 24 may vary from the six that are shown schematically in FIG. 2. The shape and the number of channels 24 can vary, for instance in order to achieve the desired attribute of very high surface area-to-volume ratios. In this regard, the helical channels 24 can pack more surface area than the linear channels 24 and thus may be preferred in one embodiment.

Capillary-channeled polymer fibers suitable for use in the present invention include, but are not limited to, fibers as described in U.S. Pat. No. 5,200,248 to Thompson, et al., and U.S. Pat. No. 5,972,505 to Phillips, et al., the entirety of each of which is incorporated herein by reference. Other types of non-circular cross section fibers suitable for use in connection with the present invention include, but are not limited to COOLMAX® and ANTRON® fibers, which are manufactured by Invista of Waynesboro, Va.; HIGHLIGHTS™ fibers, which are manufactured by Superior Threads of St. George, Utah; and 4DG™ fibers, available from Fiber Innovation Technology of Johnson City, Tenn.

In general, a capillary-channeled polymer fiber can have a surface area approximately three times the surface area of a circular cross section fiber having the same average diameter (average diameter of a non-circular fiber being defined as the average diameter of a fiber of similar cross sectional footprint, but without channels or other cavities, depressions, notches, grooves, recesses, or the like therein). As such, a coating or other surface modification applied to a capillary-channeled polymer fiber may be approximately three times as extensive as that of a circular cross section fiber of the same average diameter. Furthermore, a capillary-channeled polymer fiber can be advantageous as the fiber can provide the ability for greater loading of various chemical functionalities. The effectiveness of such surface chemistries can be greatly enhanced by the increase in mass loading. Moreover, the channels of a capillary channeled fiber can entrap particles both within the channels of the fibers and in the construct of the fabric as a whole, as is further described herein.

As such, both the width and shapes of a fiber can may be optimized for a specific projected threat agent. For example, fiber channel diameter can be designed to allow facile channel entry of a threat agent, thereby entrapping the agent in the fiber. Specifically, a channel diameter can be selected to be sufficiently large so as to allow particles access and can hold the particle in the channel thereafter. Alternatively, fiber channel diameter can be designed to encourage rejection of a threat agent from the fiber. For example, rejection of spores and other biological agents can be accomplished through the reduction of the channel diameter to the order of single micrometers or nanometers. Impact by larger bodies on fibers incorporating much smaller diameter channels than the diameter of the body results in rejection of the body according to the "shark-skin" effect. Specifically, to encourage the shark-skin effect, separation between channel walls within a channel must be smaller than the threat species to prohibit insertion, and the channel depth must be sufficient to provide physical "flex" against an impacting particle.

Use of non-circular shaped fibers can also further encourage turbulent flow patterns through the multi-layer materials and as such, can encourage interaction between the active fibers of the active layer and threat agents contained in an air or gas stream. More specifically, the channels of a capillary channeled fiber can provide areas within the layer where eddy currents can form, and these low velocity flow regions can lead to enhanced particle capture via any of the various modes of capture. The low velocity flow regions can also contribute to low pressure drop across the layer.

Figure 3:
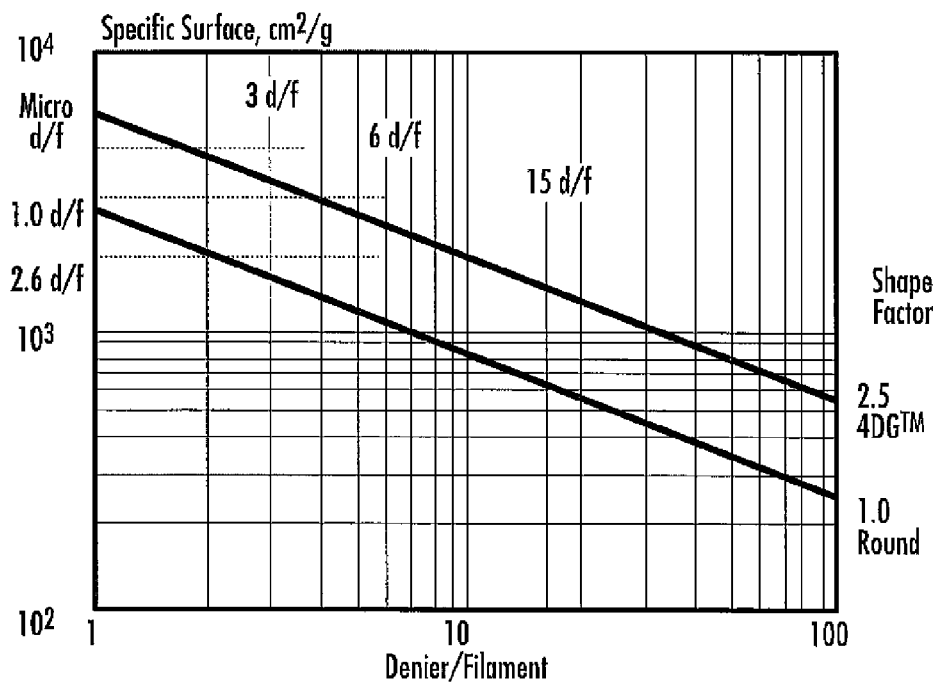
FIG. 3 graphically compares the relationship between denier and specific surface area for fibers that are round in cross section and for surface channeled fibers of the same material.

Channeled fibers can enhance filtration performance of an active layer in other ways as well. For instance, specific surface area of a fiber (i.e., the surface area per weight of the media) has a direct impact on the performance of a filter in capture efficiency. As can be seen in FIG. 3, which compares the specific surface area of round fibers and channeled fibers, specific surface area of a shaped fiber (4DG™ fiber) at a given denier is equivalent to a round fiber of the same material having a much smaller denier. For instance, a 6 denier/filament (d/f) shaped fiber has the equivalent specific surface area as a round fiber having a 0.8 d/f. Thus, conversely, when considering fibers of the same denier, a shaped fiber will have a much greater specific surface area than a round fiber of the same denier. The greater specific surface area of the shaped fiber can increase the probability of particles colliding into the fibers via impaction, interception or Brownian motion, and the active layer can thus exhibit improved collection efficiency.

Accordingly, in some instances, it may not be necessary to implement any modifications other than geometric to a fiber to form an active layer of a material as disclosed herein. In other embodiments, however, further or alternative modification can be incorporated in a layer. For instance, polymeric fibers of an active layer (either circular or non-circular cross-sectional fibers) can be functionalized with one or more chemistries that can react with an agent so as to render it harmless through entrapment, rejection, decontamination, or combination thereof. For instance, active chemistries can be bonded directly to the surface of a fiber or alternatively, a compound that is capable of leaching from the fiber over a period of time can be incorporated into the fiber, and upon reaching the fiber surface, can be available for interaction with an airborne agent.

Functionalization of a polymeric fiber can be carried out according to any method. For example, an active functional group can be bonded to a fiber at the time of fiber formation, following fiber formation or following layer formation, for instance by applying a solution or film to the fiber or layer.

In one embodiment, a compound that can react with one or more threat agents so as to bind, decontaminate or otherwise render the agent harmless can be bound to a fiber of an active layer. In general, a compound can be bonded to a fiber via an existing chemical functionality of the compound, such as amine, carboxylate, or thio groups, that can allow covalent, non-covalent, charge/charge, or any other type of bonding of the compound to a fiber surface while maintaining the chemical activity of the compound. In such an embodiment, the base fiber composition can be selected so as to incorporate an anchoring mechanism for the compound. By way of example, a compound that includes a protonated amine functionality can be bonded to a polymeric fiber surface including negative charge groups.

Surface chemistry modification of a fiber can also be carried out to encourage bonding of a compound to the fiber. Fiber surface chemistry modification processes can include, without limitation, alkaline treatments, plasma treatments, and the like. Fiber surface modification can encourage bonding of an active compound to the surface via any means. For example, fiber surface modification can increase the number of carboxylate groups on a fiber surface available for bonding to a desired active agent.

According to one embodiment, a grafting process may be employed for functionalizing a fiber surface with a desired chemistry. For instance, an at least bi-functional polymer possessing desired reactive functional groups such as carboxy, anhydride, amino or hydroxy groups may be first grafted to a fiber surface utilizing a portion of the functional groups of the polymer. Remaining functional groups of the polymer may then be utilized to attach additional functional materials to the fiber surface, e.g., biomolecules, micro-particles, nano-particles, and the like. For example, a poly(ethylene terephthalate) (PET) fiber can be modified to include a polyacrylic acid layer, with further functionalization as desired to incorporate specific decontamination compounds at the fiber surface. Surface modification of substrates in accordance with this grafting process is taught by U.S. Pat. No. 7,026,014 to Luzinov, et al., the entirety of which is incorporated herein by reference.

Direct surface modifications can also be used to establish a surface to which active ingredients can be anchored. For example, a polyamide fiber surface can be treated with ethylene-diamine to form a surface that is rich with both carboxylate and amine functionalities that can then be utilized to bond specific functional materials, e.g., decontamination materials.

Surface modification of a fiber can be utilized to affect surface energy characteristics of a fiber. For example, hydrophobic or hydrophilic homopolymers, statistical or block copolymers can be firmly attached to a fiber surface. For instance, hydrophilic poly(ethylene glycol) (PEG) or hydrophobic polystyrene (PS) polymers can be bonded to a polymeric fiber incorporating any of a variety of polymers such as poly(ethylene terephthalate) (PET), nylon, poly(vinylidene fluoride) (PVDF), polyethylene, polysiloxane, and the like. In general, low surface energy materials, such as hydrophobic materials such as polypropylene, can be effective in minimizing the adhesion of particulate matter such as spores.

Fiber surface modifications that can be employed to affect chemical detoxification or biocidal activity are quite diverse, ranging from simple chemical functional groups to macromolecular approaches, as is known in the art. For example, addition of quaternary ammonium groups to a surface is well known to have biocidal activity. Accordingly, in one embodiment, a fiber of an active layer can be modified according to methods such as those described above to exhibit a high concentration of quaternary ammonium groups.

Examples of "macro"-functional species that may be coupled to fiber surfaces to affect chemical warfare agent detoxification include, but are not limited to, catalysts synthesized from f3-cyclodextrin and o-iodosobenzoic acid for organophosphate (OP) deactivation. OP nerve agents include compounds such as sarin and S-[2-(diisopropylamino)ethyl]-O-ethyl methylphosphonothioate (VX).

A number of enzyme species can be immobilized on a fiber to de-activate threat agents such as OP agents, examples of which include diisopropylfluorophosphatases (DFPases) and organophosphohydrolase (OPH). Other proteinaceous decontaminants as may be immobilized on a fiber surface include lysins that can destroy and render harmless hazardous agents such as *Bacillus anthracis*, the causative agent of anthrax. According to another embodiment, a fiber surface can be utilized to immobilize recombinant species, such as fungi or bacteria (e.g., recombinant *E. coli*) that can be engineered to synthesize and secrete decontaminant enzymes.

By similar or other known processes, additional desirable properties may be bestowed on fibers of an active layer. Such properties may include, but are not limited to, flame-resistance, UV protection, durability, and the like.

According to one embodiment, the channels of capillary channeled fibers can be utilized to contain all or a portion of a desired active chemistry applied to a fiber. For example, channel geometries and sizes of the fibers can be developed to effectively entrap, exclude, repel or defend against particulates, biological aerosols and other cellular matter from passing through or perhaps adhering to fiber or the resulting article, as previously discussed. Moreover, channel surfaces can be directly modified with addition of functional groups, functional polymers, e.g., biopolymers, or the like. In yet another embodiment, activity of an active layer can be provided through loading of functional particles within the channels of a channeled fiber.

When considering an embodiment in which the channels of a capillary channeled polymer fiber include an active agent, e.g., a decontamination particulate agent, the resulting active layer can provide further benefits to a material. For instance, the decontamination materials held in the fiber channels can be loaded into the layer at a high loading rate and available on a large surface area for interaction with contaminants in an airstream. In conjunction with this high loading capability, as the decontamination materials can be within the fiber channels, the layer itself can still define desirable porosity between adjacent fibers, leaving adequate space between the loaded fibers for flow. As such, pathways through the layer can remain open for interaction between the decontamination materials and the airstream passing therethrough. When combined with the improvements provided by adjacent interceptor layer(s) (e.g., improved dwell time due to turbulent flow patterns), the multi-layer materials can provide excellent decontamination capabilities at low pressure drop.

A number of detoxifying agents exist as particulates or can be advantageously applied in particulate form. Examples of active particulates for immobilization in/on a fiber include, but are not limited to, metal oxides such as titanium dioxide ($TiO_2$) and metal micro and nano-particles of silver (Ag) and copper (Cu), each of which are understood to have anti-bacterial and anti-microbial activity. Alternatively, particles, e.g., polymeric particles including the same or different polymers as the fiber, can be functionalized with active compounds as described above with regard to functionalization of fiber surfaces, and the functionalized particles can then be loaded into the channels of a fiber.

Functional particles may be loaded into and affixed to the fiber/channel surface by either physical or chemical means. A fiber characteristic of relevance is the relationship between the particle size and the achievable volume/mass loading capacity of the fiber channels. For example, a high particle loading level can be attained when the channel diameter is much larger than the average diameter of the functional particles.

Particle loading mechanisms can include any suitable method including electrospray, dip-coating, flowing slurries, wicking action and the like that are common deposition or loading mechanisms. In the case of dip-coating, the wetting/wicking characteristics of the fiber can be chosen or created as described above to facilitate the process.

Following loading, particles can be bound to an existing or created functional moiety at the surface of a fiber, can be held within the channels of a fiber through surface particle/particle and particle/fiber effects, or can be encouraged to remain within the channels of a fiber through further processing. For example, a loaded fiber can be subjected to a thermal treatment that can soften the polymeric fiber and cause the partial collapse of the channel walls around the functional particles loaded therein. In general, however, further processing is not necessary, and particles loaded into fiber channels will remain therein due to surface effects, e.g., charge/charge interactions and the like.

A fiber of an active layer may be in any number of forms including, but not limited to, filament, yarn, and staple. Assembly of an active layer can occur via a variety of known woven and non-woven procedures including knitting, weaving, and nonwoven formation methods such as spunbonding and melt blowing processes, as described previously with regard to the interceptor layer. The relative percentage of different active fibers in an active layer, as opposed to other fiber types, may be varied to optimize performance. In addition, the sequence of processes may include forming an active layer with fibers that already possess the desired activity level, creating a layer and then performing the modification to provide the desired activity to the layer, or a combination thereof.

An active layer formed as a nonwoven web can be formed according to any suitable formation process as in generally known in the art. For example, following fiber formation, a plurality of fibers can be randomly laid on a traveling formation fabric according to any known process and bound to one another utilizing an adhesive, applied heat, applied pressure, or some combination thereof. Suitable adhesives are generally known in the art and can be applied during the fiber formation process or during the web-formation process, as desired. For instance, a meltblown nonwoven web can be formed according to standard processes including meltspinning of a fiber, attenuation, drawing, and deposition on a forming fabric. An active layer that is a nonwoven web can be processed according to any known web formation process including, without limitation, wet-lay, dry-lay, air-lay, needle-punching, carding, calendaring, hydro-entangling, garneting, thermal bonding, spun bonding, stitch bonding, and so forth.

An active layer that is a woven web can be formed according to any textile formation process and utilizing any weaving and/or knitting textile formation systems and devices as are generally known in the art suitable for use with polymer fibers such as those described herein. For example, weave patterns such as twill and satin that are well known in the art can be utilized alone or in combination in a disclosed active layer.

In one embodiment, an active layer can include a plurality of different fibers that differ with regard to materials, sizes, surface chemistries, loaded particulates, cross sectional shapes, and so forth so as to provide a plurality of functionalities and good physical characteristics to the layer as well as to the formed multi-layer materials. For instance, an active layer can include a mixture of different channeled fibers that can differ from one another with regard to denier and/or specific activity. For example, an active layer can include a mixture of capillary channeled fibers, each fiber type including a different denier. In one non-limiting example, a mixture of large denier fibers (greater than about 25 d), medium denier fibers (between about 10 and about 25 d) and small denier fibers (less than about 10 d) can be combined in equal parts in an active layer. A mixture of fibers of different deniers can provide the formed layer with stiffness that can aid in later processing of a formed material as well as provide different sized fibers for specific activation chemistries (e.g., larger particles loaded into the larger fibers, and so forth).

An active layer can include additional fibers as well, i.e., fibers that do not necessarily provide a specific purification activity to the layer, but can provide other desirable characteristics to the layer. For example, an active layer can include a portion of polymeric fibers with a relatively low melting point that can be utilized to soften during production (e.g., calendaring) and bind fibers of the active layer to one another and/or to an adjacent layer. Similarly, fibers included in an active layer can have a suitable geometry to promote fiber entanglement in a layer. For instance, a nonwoven active layer can include a portion of crimped fibers that can increase interfiber entanglement during formation. The relative amount of additional fiber types (i.e., those that do not incorporate a specific purification activity) in an active layer can generally be less than about 50% by weight. For instance about 25% by weight, in one embodiment.

Figure 4:
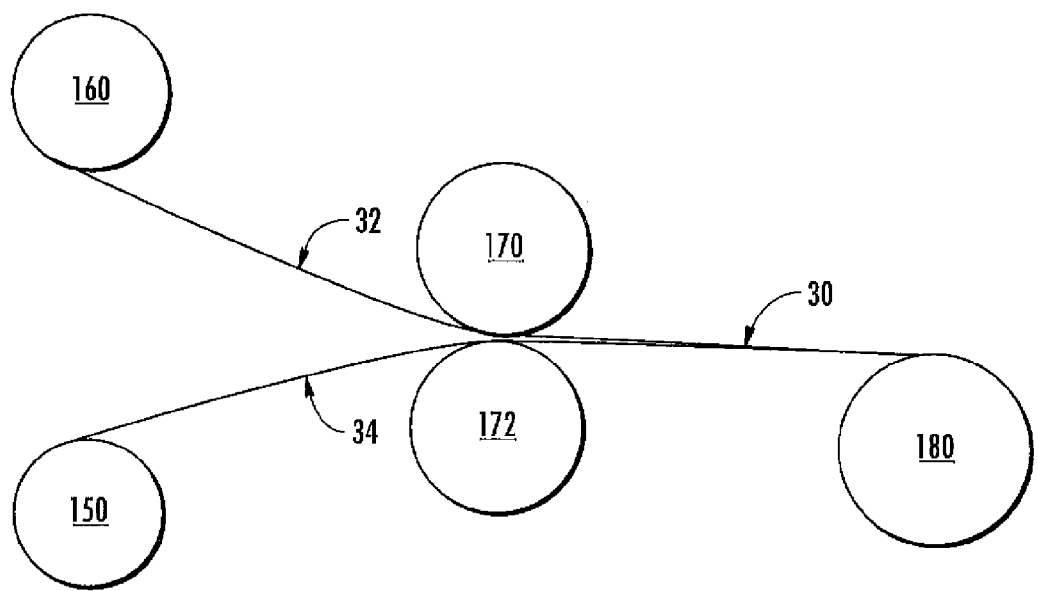
FIG. 4 schematically illustrates one system and method for forming multilayer protective materials as disclosed herein.

To form a multi-layer material as described herein, one or more active layerscan be located adjacent to one or more interceptor layers. In general, the individual layers can be simply pressed together, optionally with the addition of heat, to sufficiently adhere or laminate the layers to one another. For instance, as shown in FIG. 4, a formed interceptor layer 32 and a formed active layer 34 can be unwound from reels, 150, 160, as shown, and brought adjacent to one another. The layers 32, 34, can then be pressed together between calender rolls 170, 172 to form multilayer protective material 30, which can be wound upon take up reel 180 for further processing. For example, at least one of the interceptor layer 32 or the active layer 34 can include a portion of fibers of a relatively low melt polymer. Accordingly upon calendering and heating of the multilayer material, the low melt polymer fibers can soften and adhere the two layers together. Obviously, the heat and pressure applied to the multilayer material will be such that the fibrous structures and desired function of the individual layers are not destroyed.

A multi-layer material can include additional layers as well. For instance, in one embodiment a second active layer can be immediately adjacent to the second side of an interceptor layer, such that an interceptor layer is sandwiched between two active layers. In this embodiment, active layers on either side of an interceptor layer can be the same or different, as desired.

Other layers as may be incorporated into an multilayer protective material as described herein can include other protective layers, e.g., water resistant layers, or an inner layer designed to be warn next to the skin, for instance for softness, wicking, etc.

According to one preferred embodiment, a multilayer material as described herein can be incorporated into a final product in such a manner that an air or gas stream to be decontaminated will contact an active layer of the multilayer material prior to contacting an interceptor layer. This allows the interceptor layer to encourage turbulent flow through the active layer, as discussed above, which in turn increases dwell time for decontamination of the stream, without excessive blocking of pathways or pores of the multilayered media. For instance, and with reference to FIG. 4, the upper surface of the interceptor layer 32 can face the internal side of a finished structure (e.g., the interior of a jacket), the lower surface of interceptor layer 32 can contact the upper surface of the active layer 34, and the lower surface of the active layer can face the external side of a finished structure. Of course, as previously mentioned, a structure can include additional layers as well, on either the external or internal side of the multilayer material, as desired.

A multilayer material can be flexible and of suitable characteristics as can be utilized to form any protective structure incorporating fabric-type materials. For example, protective structures as can incorporate disclosed protective materials can take the form of any of a broad range of end products, including, but not limited to garments including protective outerwear (e.g., coats, pants, coveralls, jumpsuits, etc.), clothing (shirts, pants, shorts, etc.), face masks, hand coverings, hats, and so forth. Also encompassed herein are protective materials as may be utilized in forming other protective structures, such as tent walls, window coverings, blankets, sleeping bags, animal coverings, filter media, and the like.

In one embodiment, disclosed materials can be utilized to form a final product similar to any other fabric or fabric-type material. For instance, a protective structure can be formed by attaching shaped flexible panels of disclosed materials together as needed to create the protective structure, e.g., a garment. The panels can be all formed of disclosed materials or can include panels of other types of materials, as desired. Panels can be attached together to form the basic shape of the structure according to any attachment means including stitched or stitchless seams.

For example, a stitchless seam as described in U.S. Patent Application Publication No. 2002/0172792 to Jarvis, et al. can be utilized. According to one such embodiment, a seam can be formed between two or more substrates utilizing a thermoplastic tape. In general, any of a variety of materials can be utilized in a thermoplastic tape of a stitchless seam. For instance, some examples of suitable thermoplastic materials include, but are not limited to, polyurethane, polyethylene, polypropylene, copolyesters, and the like. In one embodiment, for example, a thermoplastic tape can be formed from an extruded polyurethane film. The thermal melting point of the thermoplastic materials used to form the thermoplastic tape may be the same or different than the materials used to form the panels. For example, a panel of a multilayer material as described herein can have a thermal melting temperature that is greater than the thermal melting temperature of the tape material(s) so that the portion of the material forming the seam substantially retains its structure and functional properties upon the application of heat and pressure. Although not required, heat and pressure are typically applied simultaneously. In general, any of a variety of conventional methods for applying heat and pressure to a material can be utilized in forming a stitchless seam. For instance, some examples of suitable methods for applying heat and pressure include, but are not limited to, the use of heated nip rolls, hot calendering techniques, ultrasonic welding techniques, the use of lasers in conjunction with nip rolls, the use of certain radio frequencies in conjunction with nip rolls, combinations thereof, and the like.

It will be appreciated that the foregoing examples, given for purposes of illustration, are not to be construed as limiting the scope of this disclosure. Although only a few exemplary embodiments of the disclosed subject matter have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A protective fibrous material comprising:
    an interceptor layer, the interceptor layer including polymeric fibers in a fibrous web formation, the interceptor layer having a basis weight of less than about 50 grams per square meter; and
    an upstream active layer positioned immediately adjacent to the interceptor layer, the active layer being a woven or nonwoven web comprising polymeric fibers, wherein the polymeric fibers include fibers defining a non-circular cross section that are open capillary channeled fibers defined by diverging opposed interior surfaces of a pair of opposed walls of said fibers, wherein particulate matter is within the channels of the capillary channeled fibers, and having a basis weight of between about 5 and about 100 grams per square meter, the active layer having a porosity that is greater than the porosity of the interceptor layer; wherein
    the protective fibrous material has a Frazier Air Permeability of at least about 1 cubic foot per square foot per minute.

2. The protective fibrous material of claim 1, wherein the polymeric fibers of the interceptor layer include polymeric fibers less than about 15 micrometers in average diameter.

3. The protective fibrous material of claim 1, wherein the polymeric fibers of the interceptor layer include nanofibers.

4. The protective fibrous material of claim 1, wherein the polymeric fibers of the active layer include fibers comprising a functional chemistry to collect, adhere, or otherwise bond a threat agent onto the surface of the fiber.

5. The protective fibrous material of claim 1, wherein the polymeric fibers of the active layer include fibers comprising a functional chemistry to decontaminate a threat agent.

6. The protective fibrous material of claim 5, wherein the functional chemistry is a characteristic of an enzyme bound to the fiber.

7. The protective fibrous material of claim 5, wherein the functional chemistry is at the surface of a particle held on the fiber.

8. The protective fibrous material of claim 1, wherein the active layer is a nonwoven web.

9. The protective fibrous material of claim 1, further comprising a second active layer immediately adjacent to the interceptor layer such that the interceptor layer is sandwiched between the two active layers.

10. The protective fibrous material of claim 1, the interceptor layer further comprising ceramic or metal fibers.

11. A composite protective structure comprising a panel of a protective fibrous material, the protective fibrous material comprising:
    one or more interceptor layers including polymeric fibers in a nonwoven web, each interceptor layer having a basis weight of less than about 10 grams per square meter and a porosity providing a Frazier Air Permeability of at least about 1 cubic foot per square foot per minute; and
    one or more woven or nonwoven active layers immediately adjacent and upstream to the one or more interceptor layers, each active layer including a plurality of polymeric fibers that entrap or decontaminate a threat agent, wherein the polymeric fibers include fibers defining a non-circular cross section that are open capillary channeled fibers defined by diverging opposed interior surfaces of a pair of opposed walls of said fibers, wherein particulate matter is within the channels of the capillary channeled fibers, each active layer having a basis weight of between about 5 and about 100 grams per square meter, the one or more active layers having a porosity that is greater than the porosity of the one or more interceptor Layers; wherein
    the Frazier Air Permeability of the protective fibrous material is at least about 0.1 cubic foot per square foot per minute.

12. The composite protective structure of claim 11, wherein the protective structure is a garment.

13. The composite protective structure of claim 11, wherein the protective structure is a tent.

14. The composite protective structure of claim 11, wherein the protective structure is a blanket or a sleeping bag.

15. The composite protective structure of claim 11, wherein the protective structure is a filter medium.

16. The composite protective structure of claim 11, wherein the panel of the protective fibrous material is flexible and is joined to a second flexible panel of the protective fibrous material.

17. The composite protective structure of claim 16, wherein the flexible panels are joined with a stitched seam.

18. The composite protective structure of claim 16, wherein the flexible panels are joined with a stitchless seam.

19. A method of forming the protective fibrous material of claim 1, the method comprising:
    locating the interceptor layer adjacent to the active layer; and
    laminating the interceptor layer to the active layer to form the protective fibrous material.

20. The method according to claim 19, wherein the interceptor layer and the active layer are laminated to one another by application of pressure.

21. The method according to claim 19, wherein the interceptor layer and the active layer are laminated to one another by application of heat at a temperature less than the lowest melting temperature of the polymeric fibers contained in the interceptor layer and the active layer.

22. The method according to claim 19, further comprising adding a functional chemistry to at least a portion of the polymeric fibers of the active layer, the functional chemistry entrapping or decontaminating a threat agent.

23. The method according to claim 22, wherein at least a portion of the polymeric fibers are capillary channeled fibers, and the functional chemistry is located in the channels of the capillary channeled fibers.

24. The method according to claim 23 wherein the functional chemistry is at the surface of a particulate.

25. The method according to claim 22, further comprising adding multiple different functional chemistries to at least a portion of the polymeric fibers of the active layer, the functional chemistries entrapping or decontaminating multiple different threat agents.

26. The method according to claim 19, further comprising locating the active layer immediately adjacent the interceptor layer and a second active layer immediately adjacent the interceptor layer, such that the interceptor layer is sandwiched between the two active layers.

27. The protective fibrous material of claim 1, further comprising one or more additional layers.

* * * * *

UNITED STATES PATENT AND TRADEMARK OFFICE
CERTIFICATE OF CORRECTION

Page 1 of 1

PATENT NO. : 8,501,644 B2
APPLICATION NO. : 12/476684
DATED : August 6, 2013
INVENTOR(S) : Christine W. Cole et al.

It is certified that error appears in the above-identified patent and that said Letters Patent is hereby corrected as shown below:

In the Specification

Column 1, line 2 (insert prior to BACKGROUND) -- This invention was made with government support under grant number HR0011-06-C-0115 awarded by the U.S. Department of Defense. The government has certain rights in the invention. --

Signed and Sealed this
Twenty-first Day of October, 2014

Michelle K. Lee
*Deputy Director of the United States Patent and Trademark Office*